Sept. 18, 1923.
J. KING
VACUUM PULSATOR ACTUATED MECHANISM
Filed May 9, 1922
1,468,238
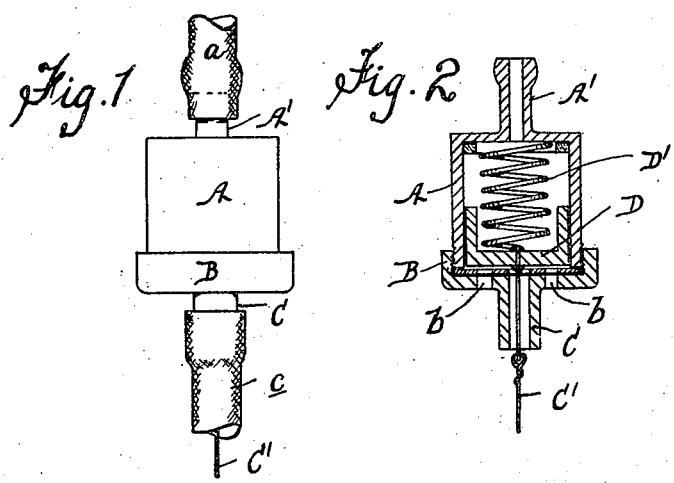
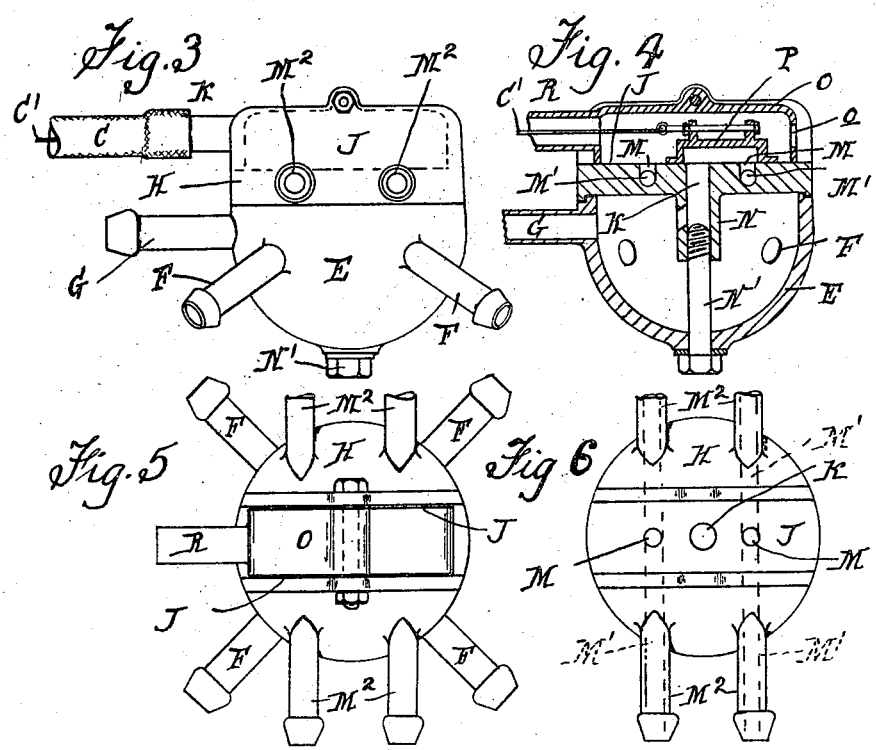
Inventor
James King
By
Pennie, Davis, Marvin & Edmonds
Attorneys Patented Sept. 18, 1923.

1,468,238

UNITED STATES PATENT OFFICE.

JAMES KING, OF AUCKLAND, NEW ZEALAND.

VACUUM PULSATOR-ACTUATED MECHANISM.

Application filed May 9, 1922. Serial No. 559,641.

*To all whom it may concern:*

Be it known that I, JAMES KING, subject of the King of Great Britain, residing at Hobson Street, Auckland, New Zealand, have invented a new and useful Improved Vacuum Pulsator-Actuated Mechanism, of which the following is a specification.

This invention has been devised primarily with the object of providing improved mechanism whereby the pulsations obtained through an alternate connection with a vacuum and with the atmosphere may be employed as the actuating power for the operation of reciprocally moving or like devices. The invention has as its secondary object the utilization of such mechanism to actuate a pulsator in the teat cup claw of a milking machine installation, or other subsidiary pulsator through the operative control of a master pulsator.

In this specification the term "pulsator" is used to denote an appliance by means of which connections are made through a main pipe to a source of vacuum, and with the air in continuous alternation.

The actuating mechanism devised is illustrated in the accompanying drawings as adapted to milking machine purposes to operate a pulsator contained in a claw to which a set of teat cups are connected to carry on cow milking operations on the well known principle. A special design of claw embodying a pulsator has been devised for use in combination with the mechanism and this also is illustrated in the drawings.

The whole of the appliances are thus adapted to be used in a system of cow milking under which the ordinary pulsations of the teat cups of each set are brought about through the agency of pulsator apparatus in the claw of that set that is actuated by the operations of a master pulsator controlling the whole of the sets of teat cups in the installation.

The invention will be described in relation to the drawings, in which:—

Figure 1 is an elevation, and

Figure 2 a sectional elevation, of the pulsator actuating device.

Figure 3 is an elevation of the claw and pulsator combined.

Figure 4 is a sectional side elevation, and

Figure 5 a plan thereof.

Figure 6 is a plan of the top plate of the combined claw-pulsator.

The actuating device, as shown in Figures 1 and 2, is formed by a cylinder A, one end of which is closed and is formed with a nipple fitting A' by means of which connection is made by the flexible pipe *a* between the cylinder end and the master pulsator to cause such end to be alternately in vacuum and at atmospheric pressure. The other end of the cylinder is closed by a cover B having air holes *b* therein and also formed with a tubular guide C extending therefrom in a line axially with the cylinder. A piston D is provided to fit within the cylinder A and to make a close engagement therein. The top side of this piston is made hollow and within the hollow a helical spring D' is placed such spring extending in compression between the piston and the closed end of the cylinder and serving to normally force the piston away to the other end of the cylinder. This spring D' is however, so adjusted as to be capable of being overcome by air pressure acting on the other side of the piston when the closed end of the cylinder is in vacuum.

Thus the working of the master pulsator will result in a reciprocatory motion being imparted to the piston, as when the pulsator connects the cylinder end with vacuum, the air pressure acts on the outer side of the piston to force it in, and when the pulsator connects the cylinder with air the air pressure on both sides of the piston is equalized and the spring acts to force the piston out again, and so on repeatedly. The piston is connected, through the tubular guide C at the cylinder's outer end, with the mechanism to be actuated through its movements.

These means in their adaptation to actuate the milking machine teat cup claw pulsator are used to reciprocate a pulsator of D slide valve type by means of a fine wire rod C' extending out through the said tubular guide C and connected to the slide valve. The wire rod is protected from outside influences by being contained within a rubber tubing C extending from the guide to the pulsator claw casing, which also allows for the flexibility of the connection as is required in milking operations.

The claw as shewn in Figures 3 to 6 is made with a lower compartment E that is provided with four nipple branches F connected respectively to the milk nipples of the four teat cups, and with a main branch G that is connected to the milking main so that this compartment is always in vacuum and the milk flows through it from the cups to the main in a manner already well known. A cover plate H is secured above this compartment and such plate is formed with a slide valve way J across its top surface having a port K in its centre that opens into the compartment E beneath and a port M on each side of such central port that connects with two passages M' leading outwards on opposite sides to nipple tubes M² made with the cover plate. Two pairs of these tubes M² are thus provided and the four are connected to the pulsator nipples of the respective teat cups of the set in the well known way.

The cover plate H is attached to the top of the compartment in any approved manner such as to allow for its removal for cleaning purposes and replacement at will. In the drawings, the plate is shewn with a downwardly depending female threaded socket N into the bottom end of which the set screw N' passing up through the claw bottom screws so as to bind the two parts together.

A cover O is fixed to enclose the top and two ends of slide way and the space enclosed thereby is open to the atmosphere at all times through apertures o.

A slide valve P is provided and fitted into the slide way J and is so made that in its reciprocations it will alternately connect each side port M with the central port K, while uncovering the other. Consequently at one limit of its movements the two nipples M² at one end will be connected to vacuum through the main compartment E beneath, while the other two are open to atmosphere, and at the other limit the connections are reversed. The teat cups will therefore receive their pulsations in pairs and in reverse order. The slide valve P is connected to and operated by the wire rod C' before mentioned, its tubular protection c being fitted on to a tubular guide R formed on the valve cover.

The air exhausted from the teat cups on each pulsation thereof passes into the milking compartment E and milk tube to aid the flow of milk to the main.

The combination of apparatus thus provided allows for the reciprocations of the piston D in the cylinder A being conveyed through the fine wire rod C' to the slide valve of the claw pulsator to reciprocate it correspondingly. The nature of the connections under which the different parts are connected by the ordinary flexible pipes used in milking machinery ensures of this movement being conveyed no matter what the relative positions of the part may be. Moreover the slide valve in its operations will be kept upon its seat in the slide way owing to the permanent connection of its underside with the milking vacuum and the resultant air pressure on its outside forcing it upon such seat. It will therefore work satisfactorily at any of the angles in which it may be placed during the milking operations.

I claim:—

1. A vacuum pulsator actuated device formed by a cylinder at one end connected to such pulsator and at the other end open to atmosphere, a piston mounted to reciprocate within such cylinder, a spring acting on such piston to force it to the open end of the cylinder and means for connecting the piston with the appliance to be operated and a milking machine teat cup claw having a slide valve form of pulsator mounted therein and connected to the piston of the aforesaid device so as to be operated by its reciprocations.

2. In combination, a pulsator apparatus, a cylinder having one end connected with such pulsator apparatus and its other end open to atmosphere, a piston mounted to reciprocate within such cylinder and a spring serving to force the piston normally to the open end of the cylinder, a teat cup claw having a vacuum connected chamber with four branch pipes extending therefrom, a cover plate fitted on such chamber formed with a central port communicating with such chamber and two side ports each connecting with two branch pipes extending from the cover plate, a slide valve mounted on the cover plate to reciprocate thereon to connect the central port with each side port while uncovering the other side port, in turn, and a connection between the slide valve and the said piston, substantially as and for the purposes specified.

In testimony whereof I affix my signature.

JAMES KING.

Witnesses:
DAVID BROWN HUTTON.
EDMUND HADLUF HODGKINSON.